United States Patent [19]
Engel et al.

[11] Patent Number: 5,761,383
[45] Date of Patent: Jun. 2, 1998

[54] ADAPTIVE FILTERING NEURAL NETWORK CLASSIFIER

[75] Inventors: Stephen J. Engel, E. Northport; Dennis Buckland, Bethpage, both of N.Y.

[73] Assignee: Northrop Grumman Corporation, Los Angeles, Calif.

[21] Appl. No.: 867,719

[22] Filed: Jun. 3, 1997

Related U.S. Application Data

[63] Continuation of Ser. No. 430,529, Apr. 27, 1995, abandoned.

[51] Int. Cl.$^6$ .................................................. G06F 15/18
[52] U.S. Cl. ............................ 395/21; 395/22; 395/23
[58] Field of Search ................................. 395/21, 22, 23; 382/190

[56] References Cited

U.S. PATENT DOCUMENTS

| | | | |
|---|---|---|---|
| 5,003,490 | 3/1991 | Castelaz et al. | 395/513 |
| 5,092,343 | 3/1992 | Spitzer et al. | 128/733 |
| 5,133,021 | 7/1992 | Carpenter et al. | 382/15 |
| 5,165,069 | 11/1992 | Vitt et al. | 358/335 |
| 5,263,097 | 11/1993 | Katz et al. | 382/190 |
| 5,386,689 | 2/1995 | Bozich et al. | 60/39.33 |
| 5,402,520 | 3/1995 | Schmitta | 395/22 |
| 5,467,428 | 11/1995 | Ulug | 395/23 |
| 5,479,572 | 12/1995 | Marcantonio | 395/22 |
| 5,533,383 | 7/1996 | Greene et al. | 73/40.5 A |
| 5,579,232 | 11/1996 | Tong et al. | 364/474.17 |
| 5,586,220 | 12/1996 | Spiker | 395/22 |
| 5,649,065 | 7/1997 | Lo et al. | 395/23 |
| 5,680,627 | 10/1997 | Anglea et al. | 395/751 |

OTHER PUBLICATIONS

Widrow et al., Neural Nets for adaptive filtering and adaptive pattern recognition, Computer, IEEE 1988, pp. 25–39, Mar. 1988.

Broomhead et al., A parallel architecture for nonlinear adaptive filtering and pattern recognition, IEEE conf on artificial Neural network, 1989, pp. 265–269.

Hill et al., Antenna beamforming for EW using adaptive layered networks, IEE Colloquium on 'Signal processing in Electronic Warfare' (Digest #1994/025), pp. 2/1–5, Jan. 31, 1994.

Dony et al., Optimally integrated adaptive learning, 1993 ICASSP, pp. 609–12, Apr. 30, 1993.

Blacknell et al., Optimum classification of non–Gaussian processes using neural networks, IEEE proceedings, pp. 55–66, Feb. 1994.

Ko et al., Neural network based novelty filtering for signal detection enhancement, 1992 IEEE Midwest Symposium, pp. 252–255.

Lippman (1987) "An Introduction to Computing with Nueral Nets".

*Primary Examiner*—Robert W. Downs
*Assistant Examiner*—Sanjiv Shah
*Attorney, Agent, or Firm*—Terry J. Anderson; Karl J. Hoch, Jr.

[57] ABSTRACT

An adaptive filtering neural network classifier for classifying input signals, includes a neural network and one or more adaptive filters for receiving input analog signals to be classified and generates inputs for the classifier. Each adaptive filter is characterized as having a predetermined number of operating parameters. An analog to digital converter converts each input signal into a digital signal before input to the neural network. The neural network processes each digital signal to generate therefrom a plurality of weighted output signals in accordance with the type of network implemented. One of the weighted output signals represents a class for the input signal, and an error signal representing a difference between the weighted output signals and a predetermined desired output is also generated by the network. A control device responsive to the error signal generates a further set of operating filter parameters for input to each of the adaptive filters to change the operating response thereof and minimize the error signal.

14 Claims, 5 Drawing Sheets

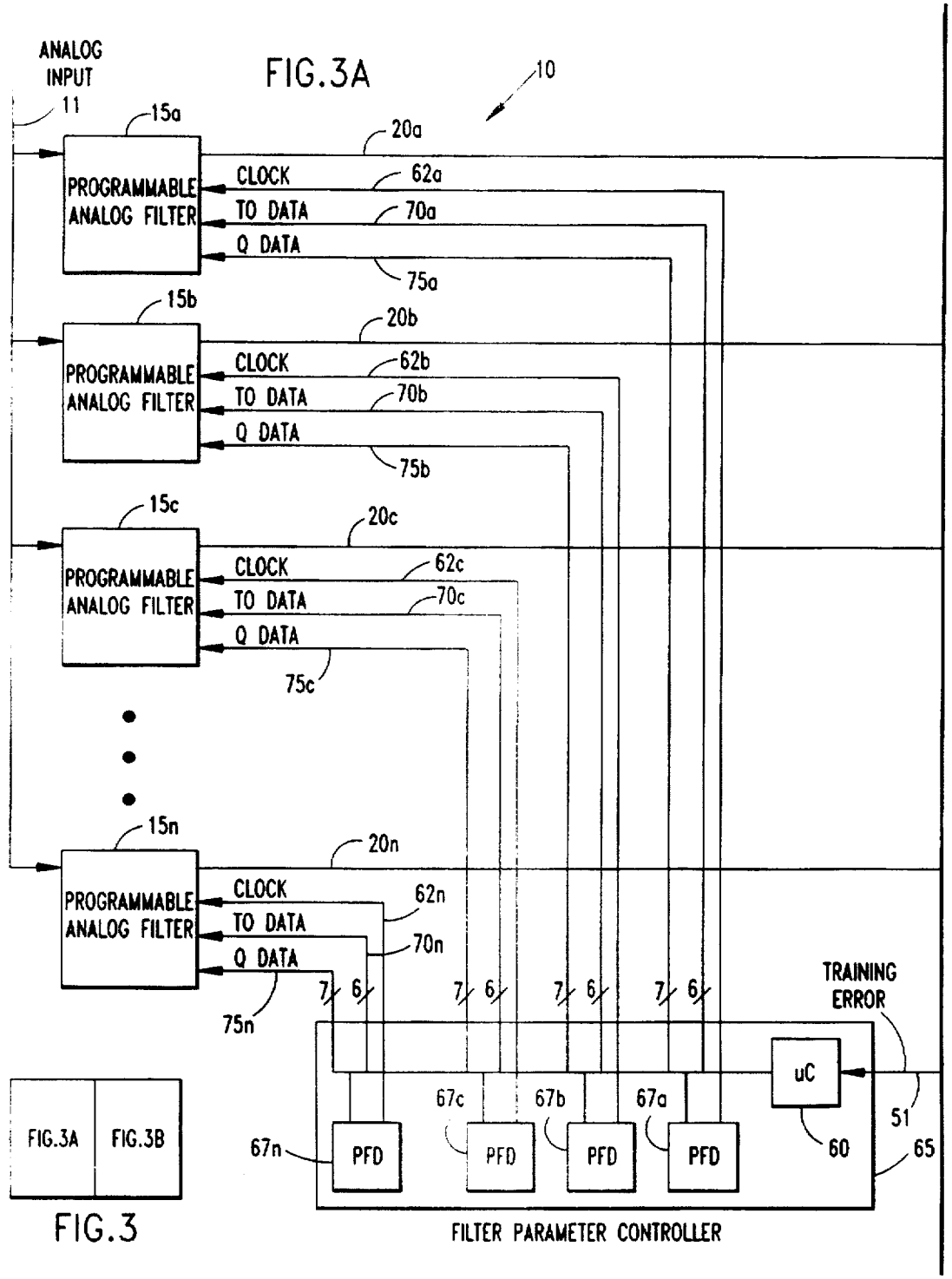

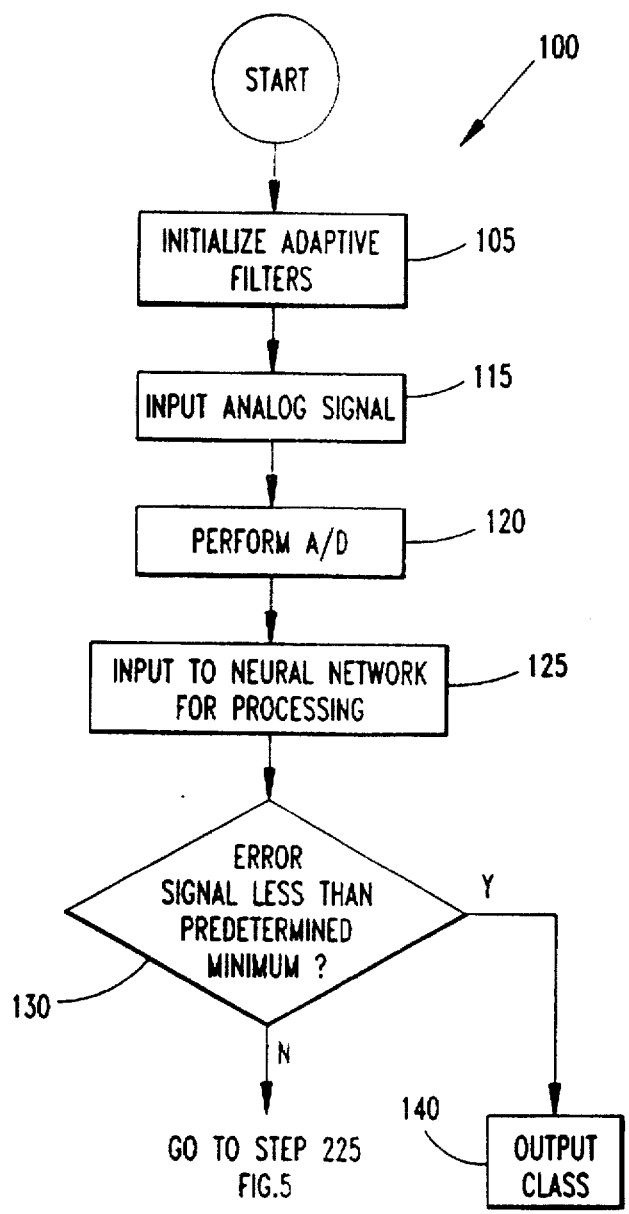

ADAPTIVE FILTERING NEURAL NETWORK CLASSIFIER

This application is a continuation of application Ser. No. 08/430,529 filed Apr. 27, 1995, now abandoned.

BACKGROUND OF THE INVENTION

1. Field of the Invention

The present invention relates generally to an apparatus for providing detection and analysis of periodic signals. More particularly, the invention is an Adaptive Filtering Neural Network Classifier (AFNNC) that is intended to detect or classify signals based on their frequency characteristics when the exact frequencies and power at those frequencies are not known a priori.

2. Description of the Prior Art

In many scientific and testing endeavors it is necessary to perform some type of signal recognition that includes the detection and analysis of periodic signals. For example, sonar signal recognition, acoustic emissions processing and vibrational analysis for rotating machinery such as helicopter, automobile, manufacturing tools, railroads, and the like, all require signal recognition involving detection or classification of periodic signals. In general, such signals may have distinguishable features in either the time domain or the frequency domain and the choice of time or frequency representation depends upon the application. Particularly, it is often easier to observe events that are periodic by using power spectrum or band-pass filter representations. For example, wheel bearing failures are often detectable by changes in the spectrum of vibration or acoustic signals emitted by the moving parts in the wheel. If a ball bearing has a crack, it will emit a compressive wave whose fundamental frequency is related to the rotation frequency of the bearing. If these frequencies are known for a given wheel rotation speed, a narrow band-pass filter centered at the critical frequencies may be used to isolate the signal of the defect from background noise. Filter output values can be related to the degree of the defect.

Unfortunately, for many applications, the critical frequencies of interest and the acceptable power in those frequencies are not known a priori. It is possible, however, to learn this information using a variety of neural network, fuzzy logic, genetic algorithm or other adaptive techniques.

Presently known devices, systems or processes may approach the pattern recognition of periodic signals by implementing neural networks. This approach typically requires a first transformation of a time domain signal to the frequency domain. The most common periodic signal representation is the power spectrum derived from a discrete Fourier transform technique such as the Fast Fourier Transform (FFT) which requires a conversion from the analog waveform to a series of digital values that corresponds to discretely sampled points on the waveform uniformly spaced in time. The time spacing is determined by the frequency content in the analog waveform. Waveforms that have high frequency components (fast moving transitions) theoretically require sampling times that are no larger than half the period of the fastest sinusoidal component in the waveform. To improve the accuracy of the transformation, sampling is typically made at least ten times faster than the theoretical minimum requirements. As a consequence, this technique often requires very expensive analog to digital converters, large memories and complex signal processors to run in real time.

Furthermore, in most cases, the critical information required to recognize a signal in the frequency domain exists at isolated frequencies and most of the spectrum is irrelevant. An analog filter may be used to pass only the information about selected frequencies, thus avoiding the need for expensive signal processing. However, this is viable only if the relevant frequencies are known a priori.

SUMMARY OF THE INVENTION

It is therefor an object of the instant invention to provide an adaptive filtering neural network classifier that has one or more programmable filters whose parameters are controlled by a Neural Network (NN) training technique to enhance signal detection and recognition.

It is another object of the instant invention to provide an adaptive filtering neural network classifier, as above, that determines the relevant frequencies and uses programmable analog filters to isolate the information at these frequencies.

It is still another object of the instant invention to provide an adaptive filtering neural network classifier, as above, that performs the recognition task and modifies itself and the programmable filters to improve its own performance.

It is yet another object of the instant invention to provide an adaptive filtering neural network classifier, as above, wherein the programmable filters and neural network are interactive, such that, the filter parameters are adjusted as if they are elements of the neural network.

It is yet a further object of the present invention to provide an adaptive filtering neural network classifier that can learn how to perform signal recognition and adjust itself in a most cost-effective manner as periodic signal patterns and background noises change.

Another object of the instant invention is to provide an adaptive filtering neural network classifier, as described above, that performs: pattern recognition (detection or classification) of any periodic signal, submarine detection and classification, helicopter transmission monitoring and diagnosis, railroad, automobile, wheel bearing monitoring, radar pulse recognition, automated manufacturing quality control; and, just-in-time maintenance for: power generating plants, assembly line manufacturing, and monitoring of any rotating machine to determine health and predict maintenance needs.

These and other objects of the invention are achieved with an adaptive filtering neural network classifier for classifying input signals, the classifier including a neural network for adaptive filtering, and additionally comprising one or more adaptive filter means for receiving analog signals to be classified and generating inputs for the classifier, each adaptive filter means characterized as having a predetermined number of operating parameters; an analog to digital converter means for converting each input signal from the one or more adaptive filter means into a digital signal; neural network means for receiving each digital signal and for processing each signal to generate therefrom a plurality of weighted output signals in accordance with a predetermined internal processing structure of the network, one of the weighted output signals representing a class for the input signal, the neural network means further generating an error signal representing a difference between the weighted output signals and a predetermined desired output; and, control means responsive to the error signal for generating a further set of operating filter parameters for input to each adaptive filter means to change the operating response thereof to minimize the error signal.

BRIEF DESCRIPTION OF THE DRAWINGS

The foregoing objects and advantages of the present invention for an adaptive filtering neural network classifier may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 4 is a block diagram of the method of operating the adaptive filtering neural network classifier of the instant invention.

DETAILED DESCRIPTION OF THE INVENTION

It has been determined that the use of neural network models ("neural nets") in image, speech, and other signal recognition has the greatest potential. This is because of the neural nets are able to process many competing hypotheses simultaneously using massively parallel nets composed of many computational elements connected by links with variable weights. As is well known, the computational elements or nodes used in neural net models are nonlinear, and are typically analog. Illustrated in FIG. 1 and characterized by equations 1(a) and 1(b) is the single layer perceptron neural network model having an output governed by:

$$y = f_n\left( \sum_{i=0}^{N-1} (w_i x_i - \phi) \right) \quad 1(a)$$

$$y = \begin{cases} +1 \rightarrow \text{Class } A \\ -1 \rightarrow \text{Class } B \end{cases} \quad 1(b)$$

Figure 1:
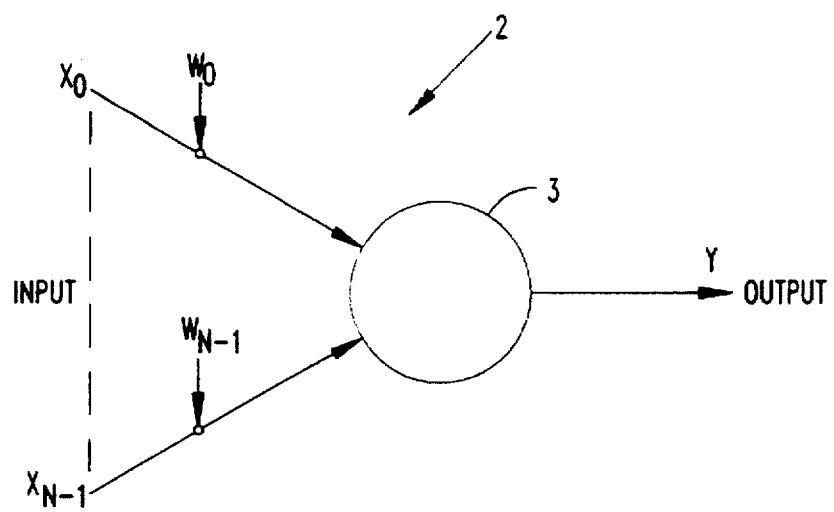
FIG. 1 is a schematic diagram of a computational element of a single neuron neural network model.

As set forth in FIG. 1 and equation 1(b), the single perceptron 2 decides whether an input belongs to one of two classes (denoted A and B). Here, in accordance with equation 1(a), the single node computes a weighted sum of N weighted inputs $w_0 x_0, \ldots w_{N-1} x_{N-1}$, subtracts a threshold or offset $\phi$, and passes the result through a nonlinearity, indicated as element 3 in FIG. 1, such that the output y is either +1 or −1. It is known that types of nonlinearities may include: hard limiters, threshold logic elements, and sigmoidal nonlinearities. The decision rule is to respond to class A if the output is +1 and class B if the output is −1. It is understood that the single layer perceptron 2 can be used with both continuous valued and binary inputs. More complex nodes may include temporal integration or other types of time dependencies and more complex mathematical operations than summation. Another type of neural net, multi-layer perceptrons, are feed-forward nets with one or more layers of nodes between input and output nodes. These perceptrons overcome many of the limitations of single-layer perceptrons with effective training algorithms.

Neural net models, such as the single layer perceptron 2 illustrated in FIG. 1, are specified by the net topology, node characteristics, and training or learning rules. These rules specify an initial set of weights and indicate how weights $w_0, \ldots w_{N-1}$ should be adapted during use to improve performance.

Figure 2:
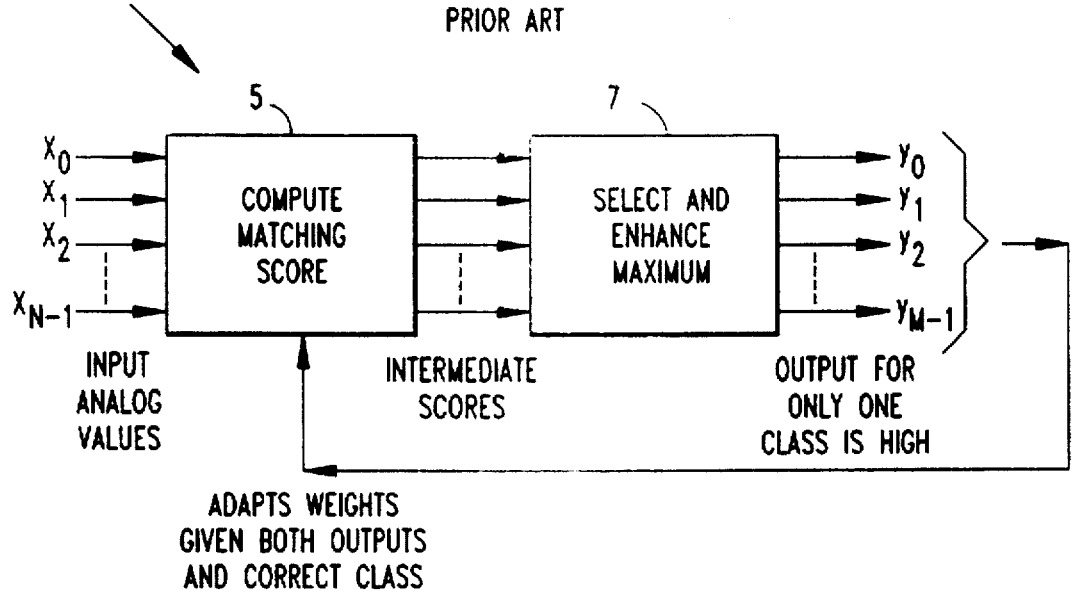
FIG. 2 is a general schematic diagram of a conventional neural network classifier.

A general block diagram of a conventional adaptive neural net classifier 4 that determines which of M classes is most representative of an unknown static input pattern containing N input elements is shown in FIG. 2. In an image classifier the inputs might be the gray scale level of each pixel for a picture and the classes might represent different objects. Here input values are fed in parallel to a first stage 5 via N input connections. Each connection carries an analog value which may take on two levels for binary inputs or may vary over a large range for continuous valued inputs. The first stage 5 computes matching scores and outputs these scores in parallel to the next stage 7 over M analog output lines. Here the maximum of these values is selected and enhanced. The second stage has one output for each of the M classes. After classification is complete, only that output corresponding to the most likely class will be on strongly or "high"; other outputs will be "low". Note that in this design, outputs exist for every class and that this multiplicity of outputs must be preserved in further processing stages as long as the classes are considered distinct. In the simple test classification system, these output lines might go directly to means for specifying class identities (e.g., LED display or labels). In more complicated cases they may go to further stages of processing where inputs from other modalities or temporal dependencies are taken into consideration.

As shown in FIG. 2, if the correct class is provided, then this information and the classifier outputs $y_0, \ldots, y_{N-1}$ can be fed back to the first stage 5 of the classifier to adapt weights using a learning algorithm. Adaptation will make a correct response more likely for succeeding input patterns that are similar to the current pattern. The learning procedure or algorithm involves the presentation of a set of pairs of input and output patterns. First, the neural net system uses the input vector to produce its own output vector and then compares this with the desired output, or target vector. If there is no difference, no learning will take place. Otherwise, the weights are changed in accordance with the learning algorithm, such as a gradient descent approach, to reduce the difference.

Operation of Adaptive Filtering Neural Network Classifier

Figure 3B:
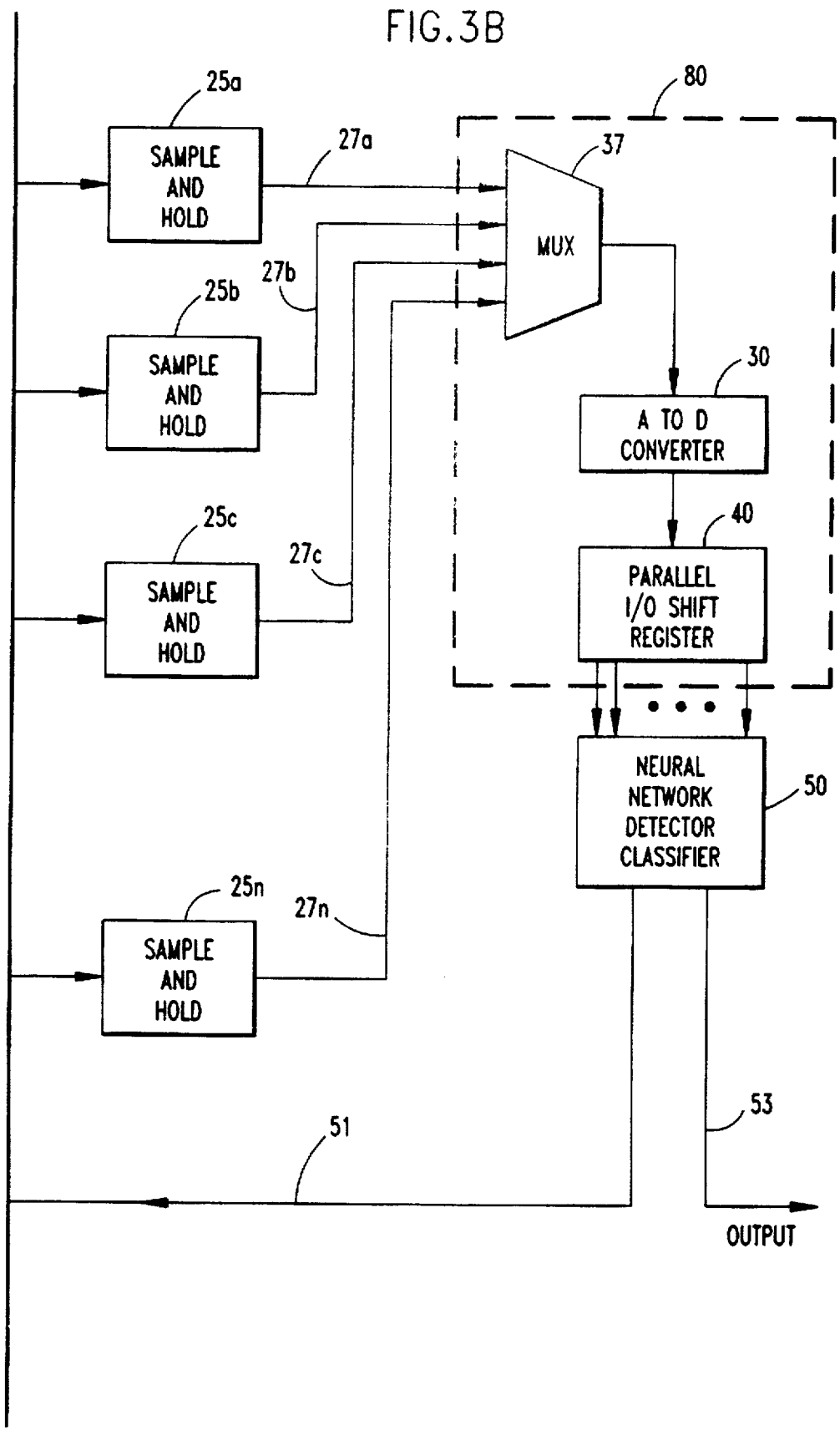
FIG. 3 is a detailed schematic diagram of the adaptive filtering neural network classifier of the instant invention.

The block diagram depicting the adaptive filtering neural network classifier 10 ("AFNNC") of the instant invention is shown in FIG. 3. In operation, an analog signal 11 containing information to be classified is input to the device and is filtered by several programmable filters indicated as elements 15a,b,c, . . . ,n. By a previously implemented training procedure to be described below, each adaptive filter has been programmed to generate respective outputs, indicated as signals 20a,b,c, . . . ,n, for input to a neural net classifier. The programmed response characteristics of each adaptive filter is such that the output signals 20a,b,c, . . . ,n contain only critical information necessary for neural network classification. Otherwise, extraneous sampling circuitry including the implementation of signal processing techniques, for e.g., FFT algorithms, would be needed to discern the critical information before being input to the network.

The Programmable Filter

In the field of signal processing, it is generally required to extract signals of particular frequencies from interfering noise. This requires a bandpass filter that allows signals of a frequency, $f_0$, to pass through for further processing, and rejects signals of other frequencies both above and below $f_0$ with a sharpness determined by the quality factor, Q, of the filter. An adaptive filter is one that allows $f_0$ and Q to be dynamically changed to provide optimal filtering. Commercially available microprocessor programmable universal switched-capacitor active filters, such as MAXIM® 260, 261, and 262 devices or their equivalents, which are microprocessor programmable second-order active filters, may be used to implement this invention. Such filters are capable of varying $f_0$ nearly linearly over a range 2:1 in 64 steps by downloading a 6-bit digital word into the device. Since this is a switched-capacitor filter, $f_0$ is also proportional to an input clock over a range as great as 750,000:1. Therefore, in a typical application, $f_0$ can be varied from 0.01 Hz to 7500 Hz with a resolution 64 times that of the clock. Such a device is also capable of varying Q in a hyperbolic fashion from 0.5 to 64 in 128 steps by downloading a 7-bit digital work into the device. By cascading sections of these filters, Q can be increased as follows:

| TOTAL SECTIONS | TOTAL Q |
| --- | --- |
| 1 | 1.00 Q |
| 2 | 1.55 Q |
| 3 | 1.96 Q |
| 4 | 2.30 Q |
| 5 | 2.60 Q |

In addition to increasing the order of the filter, cascading sections of these filters also allows implementation of different filter configurations, such as Butterworth, Chebyshev, and Bessel.

As shown in FIG. 3, the output signals $20a,b,c, \ldots, n$ of each respective adaptive filter, are sampled simultaneously by respective individual sample and hold modules $25a,b,c, \ldots, n$ having respective outputs $27a,b,c, \ldots, n$ that are converted one at a time from an analog signal to a digital signal output by an analog to digital (A/D) converter 30. Multiplexing or switching circuitry 37 is provided to enable sequential inputting of sample and hold output signals into the A/D converter 30. The digital signal output of A/D converter 30 represents the filter output value and each is sequentially loaded into a parallel I/O shift register 40 which outputs the filter values one at a time as they are converted, or, may output them together in the form of a vector. Filter values may be output in the form of vectors when it is desired to account for temporal shifts or a "time history" of a signal, for e.g., when taking into account doppler effects of radar, and the like. The shift I/O register 40 may also replace the oldest values as new values become available by shifting their positions in the register. A neural network module 50 then performs the detection or classification of the digital signal, by supervised or unsupervised techniques, as will hereinafter be described in greater detail below.

It should be understood that in an alternate embodiment, the adaptive filter output signals $20a, \ldots, 20n$ may be input directly to the neural network detector classifier 50 without multiplexor 37, A/D converter 30, and parallel I/O shift register 40 circuits, as shown by broken line 80 in FIG. 3. In such a configuration, the Neural Network Classifier 50 is an analog device that processes analog adaptive filter output signals, only.

As shown in FIG. 3, two signals are generated as a result of neural network processing: an error signal 51 that is an indication of the effectiveness of the network itself and the filters; and, an output signal 53 representing the class that the input signal belongs. The error signal 51 is input to a filter parameter controller 65 that, in the preferred embodiment, includes a microprocessor or microcontroller (μP/μC) 60 implementing an algorithm to adjust the adaptive filter parameters for the input filters $15a, \ldots, 15n$ to maximize neural network convergence time by passing only the critical information through to the network.

The Filter Parameter Controller

As shown in FIG. 3, the Filter Parameter Controller 65 establishes $f_0$ and Q of each of the adaptive filters $15a, \ldots, 15n$. It also generates clock signals $62a, \ldots, 62n$ for each adaptive filter. The controller 65 downloads the $f_{clk}/f_0$ ratio to the adaptive filters $15a, 15b, \ldots, 15n$ over respective data lines indicated as $70a, 70b, \ldots, 70n$, and, downloads Q data to the adaptive filters over data lines $75a, 75b, \ldots, 75n$ so they can more efficiently target in on the desired signals. In the preferred embodiment, the filter parameter controller 65 consists of a simple 8-bit microprocessor/microcontroller, μP/μC 60, that operates in conjunction with programmable frequency dividers (PFD's) $67a, \ldots, 67n$, that provide the necessary clock signals $62a, \ldots, 62n$ for the commercially available active filters such as described above. In the preferred embodiment, one programmable frequency divider is required for each independent adaptive filter section to provide coarse selection of $f_0$. Depending on system requirements for frequency accuracy and range, each programmable frequency divider $67a, \ldots, 67n$ can be as simple as a selectable counter divider chain, which has geometric resolution, or as sophisticated as a 32-bit numerically controlled oscillator. The μP/μC 60 may be preprogrammed with the starting values of $f_0$ and Q for each of the Adaptive Filters based on some general knowledge of the system requirements. The μP/μC 60 will then determine the best clock frequency for each of the adaptive filters and download the appropriate digital word(s) to each of the corresponding programmable frequency dividers $67a, \ldots, 67n$. The μP/μC 60 will also determine the best initial $f_{clk}/f_0$ ratio and Q for each of the adaptive filters and download the appropriate address and data words to them.

In the block diagram of FIG. 4 illustrating the operating steps 100 of the integrated adaptive filtering neural network classifier, initialization of the adaptive filter parameters is designated at step 105 and the analog signals to be classified are input at step 115. The A/D conversion step is indicated as step 120 in FIG. 4 and the converted digital signals are input to the neural network classifier for processing at step 125. As indicated at step 130 in FIG. 4, a determination is made as to whether the error signal is less than a predetermined value. If the error signal 51 is less than a minimum error value, then the network has converged and the output signal representing the class that the signal belongs may be displayed, as shown at step 140. If the error signal 51 is greater than a predetermined minimum error value, then the network has not converged, and the adaptive filter response parameters or neural network weights may be changed in order to reduce this error. To accomplish this, the AFNNC 10 will enter into a training mode, indicated at step 225 in FIG. 5, to be explained in further detail below, in order to "fine-tune" and adjust the adaptive filter parameters and/or neural network weights.

During the training mode, the AFNNC 10 analog inputs are presented to the system along with expected results. As described above, the error signal 51, which is an indication of the difference between the expected output and the system response, is input to the filter parameter controller μP/μC 60 which will determine new values of $f_0$ and Q for each respective adaptive filter $15a, \ldots, 15n$ to minimize this error. The μP/μC 60 then downloads this new information to each adaptive filters, as before, and another analog signal is input to the system. This continues until the training error has reached a predetermined minimum. The AFNNC 10 will then be optimally configured to perform the signal processing/classification for which it was trained and can be retrained for new conditions as the need arises.

Training the Neural Network Detector/Classifier

By a variety of known supervised or unsupervised neural network training techniques including gradient descent search, genetic algorithms, cooperative-competitive learning, radial basis function networks, etc., the optimum parameters for the input adaptive filters may be determined. These techniques use the adaptive filter outputs as neural network inputs for training and subsequent processing. Adaptive filter parameters such as bandpass center frequency, $f_0$, and quality factor, Q, are adjusted by the same process that adjusts neural net weights to minimize the neural network output error during training.

Figure 5:
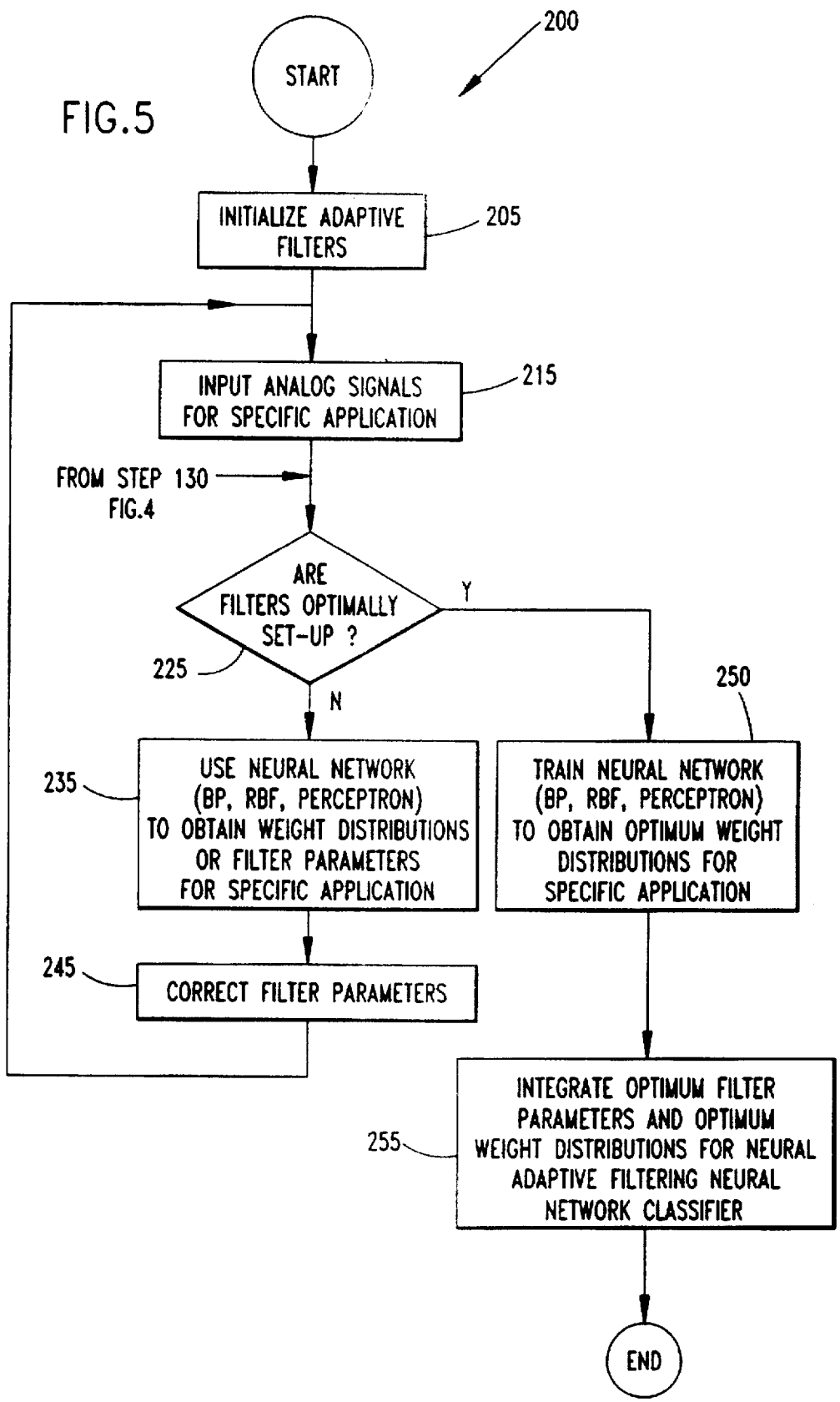
FIG. 5 is a block diagram of a method for training the adaptive filtering neural network classifier of the instant invention.

The method 200 depicting the training and integration of the adaptive filtering neural network classifier 10 is shown in the block diagram of FIG. 5. Generally, it is desired to attain an adaptive filtering neural network classifier that is application specific, i.e., is programmed to classify signals desired to be recognized. As an example, it may be known that certain mechanical bearing failures will generate periodic signals near the operating frequency of the particular mechanical device. By inputting these signals into the application specific adaptive filtering neural network classifier, a determination can be made as to the type and severity of the bearing failure. More importantly, this training procedure is used to train an adaptive filter neural network classifier for recognition of signals that are not known a priori.

As shown in FIG. 5, the first step implemented in training the classifier and optimizing the adaptive filters is to initialize all of the adaptive filters 15a, ..., 15n at the input of the device. This step is indicated as step 205 in FIG. 5, and may include configuring each adaptive filter in a manner to enable signals of predetermined known frequency ranges to be input into the neural network for the specific application of interest. Alternatively, it may entail spreading bandpass filters across a wide frequency band when the signals of interest are not known a priori. Having initialized the adaptive filters, the next step, indicated as step 215, is to input the analog signals containing the critical information for the specific application. As mentioned above, these signals and their frequency signatures may or may not be known a priori.

The next step 225 is a determination as to whether the adaptive filters 15a, ..., 15n have been optimally configured, i.e., tuned to input only the desired frequencies of interest into the neural network. If the adaptive filters 15a, ..., 15n have not been optimally tuned, then the filter configurations are to be further optimized as indicated at step 235 in FIG. 5. If the adaptive filters have been optimally configured, then the neural network weights may be fine-tuned in accordance with a neural network training technique.

As shown in FIG. 5, step 235 includes inputting the adaptive filter outputs and expected output vectors into a neural network, configured as one of the several neural network models, for e.g., back propagation ("BP"), Radial Basis Function ("RBF"), multi-perceptron, etc., to obtain resulting weight distributions. Specifically, after inputting the known signals of interest into a supervised neural network model, or, after inputting unknown signals of interest into the network, the resulting weight distributions of the neural network are analyzed and transposed by the filter parameter controller 65, as discussed above in view of FIG. 3, into optimum filter parameters, for e.g., $f_0$ and Q, for downloading into the adaptive filters.

As an example, an RBF neural network, which is a two-layer network whose output nodes μ form a linear combination of the basis (or kernel) function computed by hidden layer nodes, may be used. The basis functions in the hidden layer produce a localized response to the input stimulus, i.e., they produce a significant non-zero response only when the input falls within a small localized region of the input space. Most common versions of the basis functions is the Gaussian kernel function of the form:

$$\mu_{ij} = \exp\left\{ -\frac{(x-w_{ij})^2 (x-w_{ij})}{2\sigma_j^2} \right\} j = 1,2,\ldots,N_i$$

where $\mu_{ij}$ is the output of the jth node in the first layer, x is the input pattern, $w_{ij}$ is the weight vector for the jth node in the first layer, i.e., the center of the Gaussian for node j; $\sigma_j^2$ is the normalization parameter for the jth node, and $N_1$ is the number of nodes in the first layer. In the RBF network, the node outputs range from zero to one so that the closer the input is to the center of the Gaussian, the larger the response of the node. This is because the Gaussian kernels are radially symmetric; i.e., each node produces an identical output for inputs that lie a fixed radial distance form the center of the kernel.

Tuning of the adaptive filters using the RBF technique may be performed as follows: Typically, for signals that are or are not known a priori, all adaptive filters are configured with center frequencies $f_0$ evenly distributed over a suspected band of interest. Then each $f_0$ is moved using an unsupervised clustering technique such as the K-means algorithm. After stabilization, each adaptive filter Q can be adjusted to make them proportional to the average distance between the training patterns and the $f_0$'s. Note, that if the input adaptive filters are configured as low and/or high-pass, they can alternatively be tuned using a modified Back Propagation technique where the degree of roll-off is proportional to weight magnitude. Alternative to the above-described RBF training technique, the filter parameters may be directly determined by a method wherein the raw analog input signal 11 is first converted to a spectral power representation using DFT (FFT) signal processing algorithms. The power spectrum, represented as a vector of frequency coefficients, is used as the input to the particular neural network. During supervised training, one of the several neural network paradigms may then be implemented to adjust the weights connecting the input vector to the network in a way that improves the desired neural network output, i.e., minimizes error with fast convergence. After training the network, the input weights may be analyzed to determine which of the spectral coefficients contain useful information. Inputs that contribute to successful performance generally have larger weight magnitudes than those that contain irrelevant or contradictory information. Given the new filter parameters, a neural network will be formed that uses the adaptive filter outputs rather than DFT spectral coefficients as neural network inputs.

The next step, indicated as step 245 in FIG. 5, is to adjust all adaptive filter parameters, i.e., configure each filter's center frequency and quality factor, to reflect the input weight distribution, and thus, preserve critical information while suppressing frequencies that are not useful. This is a tremendous cost-savings technique because, for a particular application, only a few adaptive filters may be needed when the critical frequency information is sparse.

Once the adaptive filters 15a, ..., 15n are tuned, it may be necessary to further train the weights of the neural network classifier to be used. Thus, in the manner described above, the input signals are input to the tuned adaptive filters (at step 215, FIG. 5). The outputs thereof are input to the neural net classifier in the manner as described above with respect to FIG. 3. As indicated at step 225, the determination as to whether the adaptive filters 15a, ..., 15n have been optimally configured is again made. For this iteration, the input adaptive filters have already been adjusted, as described above, to input only the desired frequencies of interest into the neural network so that the neural net training algorithm can now be implemented as shown at step 250 in FIG. 5.

In the preferred embodiment, a supervised training algorithm such as Least Mean Squares or Back Propagation is implemented to train the neural network and obtain optimum node (weight) distributions for the network used in the classifier. It should be understood that a neural network training technique that is different from the training technique implemented at step 235 may be used to train the neural network in step 250.

As an example, the Back Propagation technique may be implemented at step 250, shown in FIG. 5 that uses a gradient search technique to minimize a cost function equal to the mean square difference between the desired and the actual net outputs. The desired output of all nodes is typically "low" (0 or <0.1) unless that node corresponds to the class the current input is from in which case it is "high" (1.0 or >0.9). The net is trained by initially selecting small random weights and internal thresholds and then presenting all training data repeatedly. Weights are adjusted after every trial using side information specifying the correct class until weights converge and the cost function is reduced to an acceptable value. An essential component of the algorithm is the iterative gradient method that propagates error terms required to adapt weights back from nodes in the output layer to nodes in lower layers in order to minimize the mean square error between the actual output of a multilayer feed-forward perceptron and the desired output. It requires continuous differentiable non-linearities. In the description below, each node assumes a sigmoid logistic non-linearity having the function f($\alpha$) in accordance with the following equation.

$$f(\alpha) = \frac{1}{1 + e^{-(\alpha-\theta)}}$$

First, all weights and node offsets are initialized to small random values. Then, a continuous valued input vector $x_0$, $x_1$, ... $x_{N-1}$ is presented and the desired outputs $d_0$, $d_1$, ... $d_{M-1}$ are specified. When the net is used as a classifier, all desired outputs are typically set to zero except for the output corresponding to the class the input is from which is set to one (1). That desired output is 1. The input could be new on each trial or samples from a training set could be presented cyclically until weights stabilize.

The next step is to calculate the actual outputs $y_0$, $y_1$, ... $y_{M-1}$ using the sigmoid nonlinearity in the equation above. Using a recursive algorithm starting at the output nodes and working back to the first hidden layer, the weights are adjusted by $$w_{ij}(t+1) = w_{ij}(t) + \eta \delta_j x_i;$$

In this equation $w_{ij}(t)$ is the weight from hidden node i or from an input to node j at time t; $x_i$ is either the output of node i or is an input, $\eta$ is a gain term, and $\delta_j$ is an error term for node j. If node j is an output node, then $$\delta_j = y_j(1-y_j)(d_j-y_j)$$

where $d_j$ is the desired output of node j and $y_j$ is the actual output. If node j is an internal hidden node, then $$\delta_j = x_j(1-x_j) \sum_k \delta_k w_{jk},$$

where k is over all nodes in the layers above node j. Internal node thresholds are adapted in a similar manner by assuming they are connection weights on links from auxiliary constant-valued inputs. Convergence is sometimes faster if a momentum term is added and weight changes are smoothed by:

$$w_{ij}(t+1) = w_{ij}(t) + \delta \eta_j x_j + \alpha(w_{ij}(t) - w_{ij}(t-1))$$

where $0<\alpha<1$. The process repeats itself by inputting continuous valued input vectors $x_0$, $x_1$, ... $x_{N-1}$ (and the desired outputs) until there are no more inputs to train.

Finally, the adaptive neural network classifier is integrated at step 255 shown in FIG. 5 wherein both the adaptive filter parameters and neural network weights are optimally configured for the specific application.

As an alternative to the supervised neural network training techniques described above, unsupervised training techniques may be implemented in the adaptive filter neural network classifier as explained in view of FIG. 3. Thus, for e.g., a variety of input signals 11 may be input to the adaptive filters 15a, . . . 15n wherein the output class or expected output signals 53 are not yet known, and furthermore, might even represent a new class. The unsupervised training techniques may involve comparing these input signals with each other to look for response similarities. All input signals that are similar, may be "clustered" to represent a class, which may or may not have significance, (good or bad, for e.g), and the number of classes for the particular set of input signals may be prespecified. The significance of these classes may be subsequently learned by more experimentation using other techniques.

Once classes are formed for the input signals 11 using unsupervised neural network training techniques, the response patterns or templates generated for these classes may be used as inputs for supervised training techniques described above, and further input signals may be classified in accordance with these techniques.

Although shown and described in what we believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

What is claimed is:

1. An adaptive neural network classifier for classifying an input analog signal comprising:

one or more programmable filter means for receiving said input analog signal to be classified and generating filter output signals, each said programmable filter means being characterized as having a predetermined number of operating parameters;

an analog to digital converter means for converting each of said filter output signals from said one or more programmable filter means into a digital signal;

adaptive neural network means for receiving and processing each said digital signal to generate therefrom a plurality of weighted output signals in accordance with a predetermined processing structure of said adaptive neural network means, one of said weighted output signals representing a class for said input analog signal, said neural network means further generating an error signal representing a difference between said one of said weighted output signals and a predetermined desired class; and control means responsive to said error signal for generating a further set of operating filter parameters for input to each said programmable filter means to change the operating response thereof to minimize said error signal.

2. The adaptive neural network classifier for classifying an input analog signal as claimed in claim 1, wherein said adaptive filters are configured as bandpass filters having operating parameters including center frequency $f_o$ and quality factor Q, said operating parameters initially predetermined based on said input signal to be classified.

3. The adaptive neural network classifier for classifying an input analog signal as claimed in claim 1, wherein said operating parameters are predetermined in accordance with a training technique performed on said neural network classifier.

4. The adaptive neural network classifier for classifying an input analog signal as claimed in claim 3, wherein said training technique involves inputting predetermined known input signals and desired output signals into said neural network classifier and for generating a plurality of weighted output signals.

5. The adaptive neural network classifier for classifying an input analog signal as claimed in claim 4, wherein said operating filter parameters are generated in accordance with said plurality of weighted signals generated by said training technique.

6. The adaptive neural network classifier for classifying an input analog signal as claimed in claim 1, wherein said one of said weighted output signals represents an unknown class for said input signal, said neural network means further clustering like weighted output signals to form a class thereof.

7. The adaptive neural network classifier for classifying an input analog signal as claimed in claim 1, wherein said neural network means has a weighted distribution and adjusts said weighted distribution to minimize said error signal.

8. An adaptive neural network classifier for classifying an input analog signal comprising:

one or more programmable filter means for receiving said input analog signal to be classified and generating a filter output signals, each said programmable filter means being characterized as having a predetermined number of operating parameters;

adaptive neural network means for receiving and processing each said digital output signal to generate therefrom a plurality of weighted output signals in accordance with a predetermined processing structure of said adaptive neural network means, one of said weighted output signals representing a class for said input analog signal, said neural network means further generating an error signal representing a difference between said one of said weighted output signals and a predetermined desired class; and control means responsive to said error signal for generating a further set of operating filter parameters for input to each said programmable filter means to change the operating response thereof to minimize said error signal.

9. The adaptive neural network classifier for classifying an input analog signal as claimed in claim 8, further including an analog to digital converter means for converting each said filter output signals from said one or more adaptive filter means into a digital signal, wherein said neural network means receives each digital signal for processing.

10. The adaptive neural network classifier for classifying an input analog signal as claimed in claim 8, wherein said neural network means has a weighted distribution and adjusts said weighted distribution to minimize said error signal.

11. A method for classifying signals with a neural network classifier, said method comprising the steps of:

inputting an analog signal to be classified into one or more programmable filter means for generating filter output signals for input to an adaptive neural network means, each said programmable filter means being characterized as having a predetermined number of operating parameters;

processing each of said filter output signals in said adaptive neural network means to generate therefrom a plurality of weighted output signals in accordance with an internal processing structure of said adaptive neural network means, one of said weighted output signals representing a class for said input analog signal, and further generating an error signal representing a difference between said one of said weighted output signals and a predetermined desired class; and inputting said error signal to a control means and generating a further set of operating filter parameters for input to each said programmable filter means to change the operating response thereof to minimize said error signal.

12. The method for classifying signals in accordance with claim 11, wherein said inputting of said analog signal additionally includes inputting of desired output signals into said neural network classifier for generating said error signal.

13. The method for classifying signals in accordance with claim 12, further including the step of performing analog to digital conversion of each said filter output signals prior to input to said neural network.

14. The method for classifying signals in accordance with claim 11, further comprising adjusting a weighted distribution of said neural network to minimize said error signal.

* * * * *